United States Patent

[11] 3,623,615

[72] Inventor Albert A. Kawachi
150-76 Village Road, Jamaica, N.Y. 11432

[21] Appl. No. 814,575
[22] Filed Apr. 9, 1969
[45] Patented Nov. 30, 1971
[32] Priorities July 9, 1968
[33] Japan
[31] 43/58691;
July 9, 1968, Japan, No. 43/58692

[54] TAPE REEL STORAGE APPARATUS
7 Claims, 10 Drawing Figs.

[52] U.S. Cl. .......... 211/40, 312/13
[51] Int. Cl. .......... A47b 81/06
[50] Field of Search .......... 211/40, 41, 44; 312/9, 10, 20, 13

[56] References Cited
UNITED STATES PATENTS

| | | | |
|---|---|---|---|
| 1,994,195 | 3/1935 | Hay | 211/41 |
| 3,303,934 | 2/1967 | Pressley | 211/41 |
| 3,472,386 | 10/1969 | Osojnak | 211/40 |

FOREIGN PATENTS

| | | | |
|---|---|---|---|
| 237,643 | 7/1925 | Great Britain | 312/13 |
| 884,795 | 12/1961 | Great Britain | 312/10 |
| 1,216,157 | 11/1959 | France | 211/40 |

*Primary Examiner*—Roy D. Frazier
*Assistant Examiner*—Abraham Frankel
*Attorney*—Kenyon & Kenyon Reilly Carr & Chapin

ABSTRACT: Disc-shaped reels of photographic film or data processing tapes are stored in side-by-side position on a horizontally elongated rack having longitudinally extending parallel supports for storing individual reel cases on their rims in a vertical position. Provided on the rim of the reel case is at least one projection extending outwardly from the rim. A reel case is removed from the rack by rotating the case until the projection contacts a rack support, at which time continued rotation causes the reel case to pivot and roll over the rack support and out of the rack space. In a further embodiment the parallel supports provide a pair of spaced outer ridges and a pair of spaced inner ridges adapted for supporting reels of various diameter sizes.

INVENTOR.
ALBERT A. KAWACHI
BY
Kenyon & Kenyon
ATTORNEYS

INVENTOR.
ALBERT A. KAWACHI
BY
Kenyon & Kenyon
ATTORNEYS

TAPE REEL STORAGE APPARATUS

BACKGROUND OF THE INVENTION

The present invention relates to tape and film reels and their storage cases, and more particularly to apparatus for storage of individual reels of photographic film or data processing tapes and ready removal of such reels from horizontally elongated racks.

The data processing industry presently requires the extensive use of magnetic tapes which are wound on reels. When not in use, the reels are generally inserted into disc-shaped canisters or cases and placed on storage racks. To facilitate processing of the tapes it is important that the tapes be filed in a compact storage space and be adapted for rapid insertion into and withdrawal from the storage racks. Quite commonly, the tape-reel cases are stored in a vertical position in side-by-side relationship on horizontally elongated racks. The racks are often provided with crosswise separators which form open slots for containing individual cases and supporting such cases against longitudinal movement. To remove a case from a rack, the user often must pry his fingers through the space in between adjacent cases to grasp the desired case. To store a case it is often partially lowered in between cases and then dropped into position in an open slot, perhaps instinctively to protect the user's fingers from injury. Therefore, to permit secure handling of the cases, it has been necessary to employ separators spaced apart from adjacent separators a distance sufficient to provide a finger space between cases. This, however, is disadvantageous in that it results in the waste of tape storage space.

One prior art reel storage apparatus employs a flexible band encircling the rim of the reel which includes a latch for securing the ends of the bank together. By using a band instead of a case, the thickness of each reel unit is minimized. Attached to the band is a hook member which grabs onto a cooperating member located on a rack for mounting the reel thereon. Variations of this hanger mount for reels include the use of interlocking lugs, latches or slides provided on the reel or reel case, and also on the rack. In each instance, the reel or reel case is adapted for removal from the rack by releasing the hook, lug or slide connection. While such prior art apparatus permits compact storage of tape reels and cases, such apparatus requires special latching devices or fasteners for mounting the reel cases on racks, which are often complex and expensive.

In another prior art reel storage apparatus, the casing is formed of a pair of complementary upper and lower hollow casing parts which are releaseably connected together and can be opened to permit insertion or withdrawal of a selected reel from its casing without removing the casing from a rack or from a stack of casings.

As noted above, a common type of reel storage rack employed consists of a pair of parallel racks extending longitudinally and a plurality of transverse separators extending across the racks. In such instances the parallel racks, providing a support for the reel cases, are spaced apart a distance which is substantially less than the diameters of the reel cases to be supported thereon. Generally, the smaller this distance between the racks is, the easier it is to withdraw a reel from the rack. On the other hand, as this distance decreases, the angle of support, defined as the angle between the two radii of a reel case taken at the points where the rim of such case contacts the rack, also decreases and thus the stability of the reel case in the rack decreases. When using a rack for holding cases having the same diameter, an optimum spacing between the longitudinal rack supports can be determined which suitably accommodates both withdrawal and stability requirements. However, where reels having different diameter sizes are to be stored on the same rack, the larger reels will be less stably supported since the angle of support for the larger reels will be smaller.

One conventional disc storage rack is disclosed by Slough in U.S. Pat. No. 2,297,081. In Slough, a rack comprising a perforated and bent sheet of metal receives discs of varying diameters edgewise in a series of elongated, spaced narrow perforations forming parallel slots. The discs are supported by the walls and edges of the perforated slots. While the rack will support discs of varying sizes, the angle of support will be smaller for the larger discs and, consequently, such larger discs will be less stably supported in the rack against transverse movement than the smaller discs.

Other conventional reel storage racks employ one or more side supports which are adjustable to different positions to accommodate reels having different diameters. Such storage racks generally require an adjustment for each different size reel placed into a given slot.

OBJECTS

It is an object of the present invention to provide reel storage apparatus which permits filing of reel cases in a compact storage space.

It is another object to provide reel storage apparatus which permits secure handling of reel cases during insertion and withdrawal from storage racks.

It is another object to provide reel storage apparatus which facilitates swift withdrawal of reel cases from a compact storage space.

It is another object to provide reel storage apparatus in which the conventional reel cases can be easily converted for use therein.

It is a further object to provide reel storage apparatus which stably supports reel cases having various diameter sizes.

It is another object to provide reel storage apparatus which is simple and inexpensive and requires no special mounting, hanging or adjustment devices.

SUMMARY OF THE INVENTION

These and other objects, which will become apparent from the detailed disclosure and claims to follow, are achieved by the present invention which provides apparatus for storage of tape or film reels comprising a disc-shaped reel case and a horizontally elongated rack including longitudinally extending parallel supports for storing reel cases on their rims in a vertical position. The longitudinal supports provide a pivot means for the reel case. Provided on the reel case is at least one projection extending outwardly from the rim in a substantially radial direction. Removal of a reel case from the rack is effected by rotating the reel case in the rack until the projection contacts the pivot means, at which time continued rotation causes the reel case to roll over the pivot means and out of the rack space. The projections, in addition to serving the purpose as a pivot stop, also function as a finger catch so as to facilitate rotation of the reel case. In a further embodiment the parallel supports provide a pair of spaced outer ridges and a pair of spaced inner ridges adapted for supporting reels having a wide range of diameter sizes.

It is to be understood that as used herein, the term "reel case" is intended to mean either a disc-shaped container enclosing a tape reel or the "case" formed by the combination of the sides or hubs of a reel and a circular rim band.

It is also to be understood that, while the invention is particularly directed to apparatus for storage of reels of photographic film or data processing tapes, the scope of the invention is intended to also embrace apparatus for storage of other articles having a circular profile, such as recording discs, cylinders, circular belts and reels of wire.

THE DRAWINGS

Figures 1, 2, 3, 4:
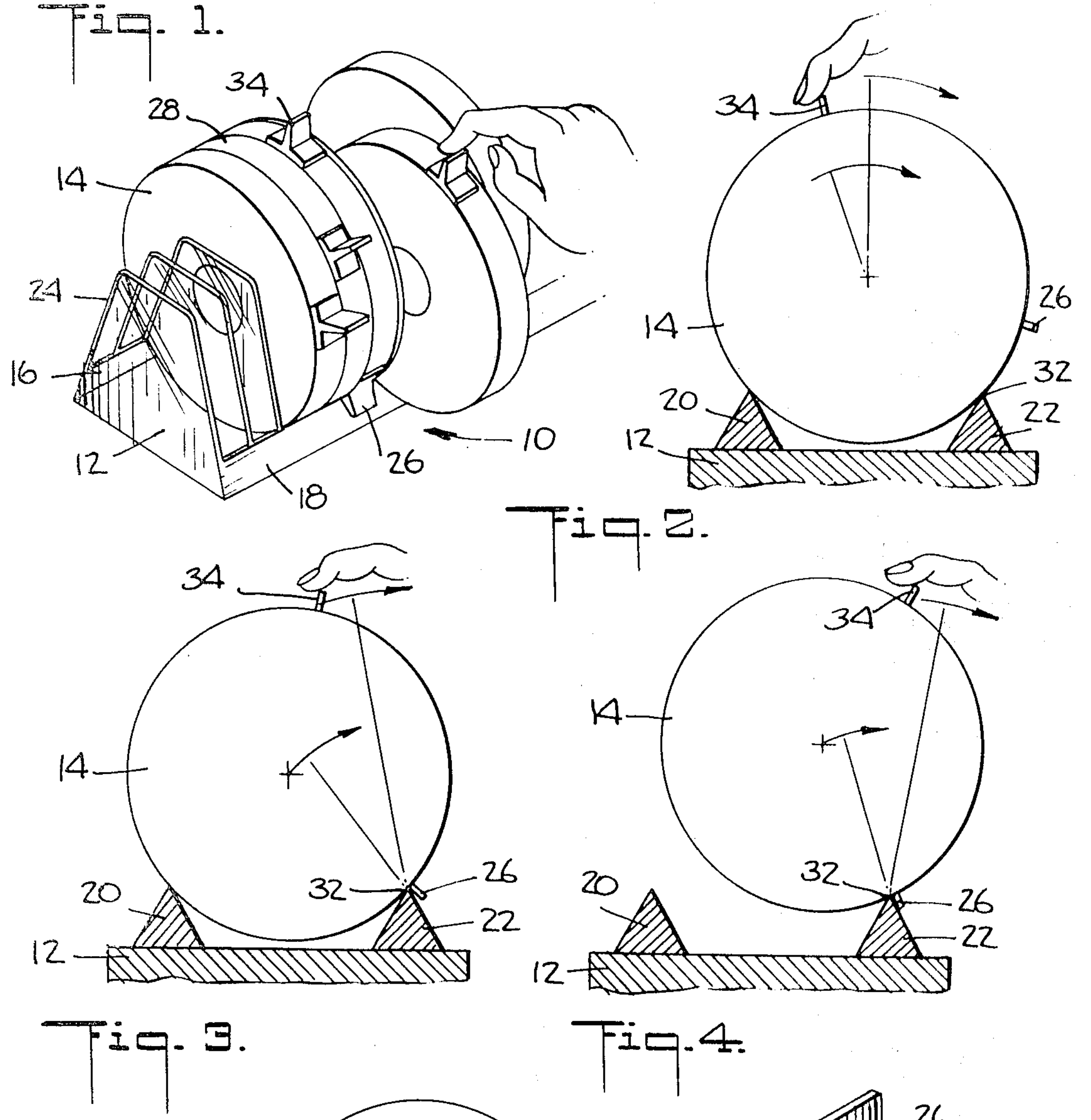
FIG. 1 is a perspective view of the reel storage apparatus illustrative of the invention, with the reel cases stacked in a rack.
FIGS. 2 through 5 show the various positions of a reel case as it is rotated and pivoted out of a rack.
Figure 5:
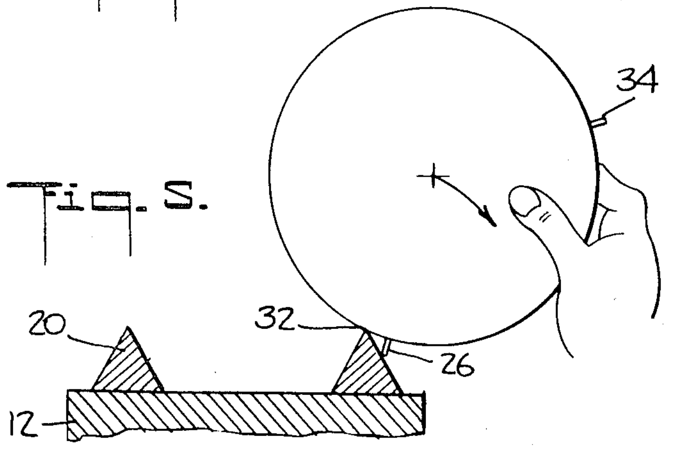

Referring to FIG. 1, the reel storage apparatus 10 generally comprises the combination of a rack 12 and a reel case 14. Rack 12 is elongated in a horizontal direction to accompany a plurality of reel cases 14 stacked side-by-side in a vertical position. More specifically, the rack 12 comprises parallel rack supports 16 and 18, each extending in a longitudinal direction and separated from each other a distance which is substantially smaller than the diameters of the reel cases 14 so that the cases 14, when seated in the rack 12 will stand vertically on edge supported between rack supports 16 and 18. It is to be noted that the rack supports 16 and 18 may be formed from a single sheet of rigid sheet material, as shown in FIG. 1, or from two separate pieces of rigid material, such as the longitudinal rack supports 20 and 22 shown in FIGS. 2 through 5. If desired, one or more transverse separators 24 can be employed to support the reel cases 14 against longitudinal movement. A series of separators 24 can be spaced a given longitudinal distance apart so as to define a row of slots with the rack supports 16 and 18. Separators 24 are made of rigid sheets of material or wires which are secured to the rack supports 20 and 22, or alternately, one or more individual separators 24 can be employed which are readily removable with respect to such supports 20 and 22.

Figure 6:
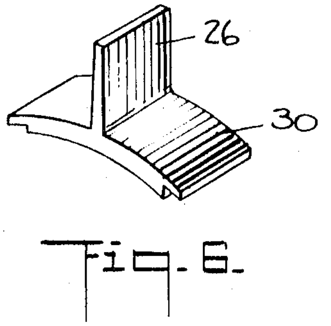
FIG. 6 is a perspective view of one type of tab suitable for attachment to a reel case.

Provided on each reel case 14 is at least one projection, such as the tab 26 shown, extending outwardly from the rim 28 of reel case 14 in a substantially radial direction. Preferably, the tab 26 is formed integral with the reel case 14, projecting outwards from the rim 28. However, tab 26 can instead by provided as a separate member, as shown in FIG. 6, which is adapted for attachment to the rim 28 of a conventional reel case or reel band. In such instance, the base area 30 of tab 26 is formed with a radius of curvature conforming with that of the rim curvature of the particular reel case to which it is attached.

Referring to FIGS. 2 through 5, there is indicated, respectively, the positions of the reel case 14 relative to the rack supports 20 and 22 as the case 14 is being removed from storage. Removal is effected by rotation of the reel case 14 in the rack until the tab 26 contacts or abuts with the rack support 22. An edge 32 of rack support 22 provides a pivot means whereby a continued rotative force on reel case 14 causes such case 14 to pivot, at the location of tab 26, and roll over the rack support 22 and into a position where it can be securely grasped by a user.

To facilitate rotation of the reel case 14, an additional tab 34 is provided on the rim 28 spaced substantially apart. With this arrangement, referring again to FIGS. 2 through 5, the lower tab 26 functions as a pivot on the rack support 22 while the upper tab 34 functions as a finger catch which facilitates rotation and insures a finer control of the movement of the reel case 14 in relation to the storage rack 12.

In this fashion, a simple and inexpensive high-density type storage system is provided permitting filing of tapes in a compact arrangement, while also enabling secure handling of such tapes.

Figure 7:
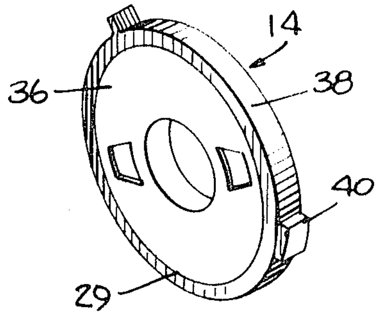
FIG. 7 is a perspective view of one type of reel case, illustrative of one embodiment of the invention.

While the FIGS. 1 through 5 show the projection means constituted by two tabs on each reel case, it is to be understood that other forms of projections, such as a latch, can be employed as either the finger catch or the pivot means. More particularly, a reel case is shown in FIG. 7 wherein the reel case 14 is constituted by the hub or sides 36 of a tape reel and a circular band 38 which encircles the side edges 29. Band 38 can be held securely in place on edges 29 by suitable means such as the latch 40. Latch 40 projects from the outer surface of band 38 thereby additionally serving the same purposes as the tabs 26 and 34. In this fashion, latch 40 functions as either a pivot means for withdrawing the reel case 14 from a rack, or such latch 40 provides a finger catch for facilitating rotation of the reel case 14 in relation to the storage rack.

Figures 8, 9:
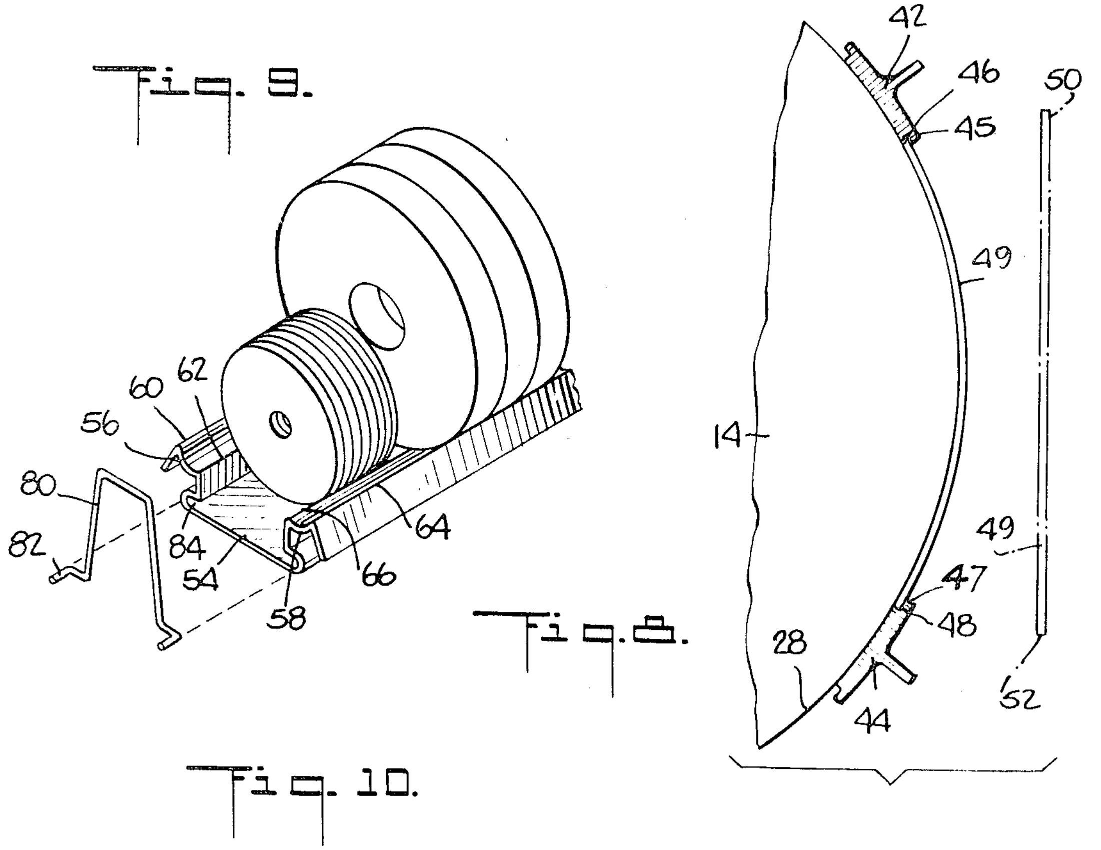
FIG. 8 is a side view of a tab arrangement for a reel case, which also provides a mount for a removable label, illustrative of another embodiment of the invention.
FIG. 9 is a perspective view of reel storage apparatus having parallel rack supports adapted for supporting reels of varying diameter sizes, in accordance with another embodiment of the invention.

Referring to FIG. 8, there is illustrated an additional advantage provided by the use of the projections or tabs according to the present invention. More particularly, two tabs 42 and 44 re spaced apart along the rim 28 of reel case 14 a distance which provides for easy manipulation of the reel case 14 out of a storage rack. Tabs 42 and 44 are provided with shoulders 45 and 47 forming notches 46 and 48, respectively, into which an identification label 49 can be securely held. Label 49 is attached to the reel case 14 by merely flexing the same so that the ends 50 and 52, respectively, of label 49 fit into notches 46 and 48, respectively. In this fashion, the tabs 42 and 44 eliminate the need for any special label-mounting parts on the reel case 14 and also insure a specified location on the rim 28 for identification purposes wherein the label 49 will always be in view when the reel case 14 is in a position for withdrawal from the rack.

In Referring to FIGS universal rack and 10, there is shown a further embodiment of the invention wherein a rack 54 comprises a pair of longitudinal parallel supports 56 and 58 adapted sufficiently large to insure stability of discs reel cases over a diameter sizes. Rack support 56 includes an outer ridge 60 and an inner ridge 62 extending the length of such support 56. Similarly, rack support 58 includes an outer ridge 64 and an inner ridge 66. Outer ridges 60 and 64 extend substantially above the height of inner ridges 62 and 66. Ridges 60, 62, 64 and 66 are parallel to each other and, depending upon the diameter of a reel case, each such case will be supported by the spaced pair of inner ridges 62 and 66, or by the pair of outer ridges 60 and 64.

Figure 10:
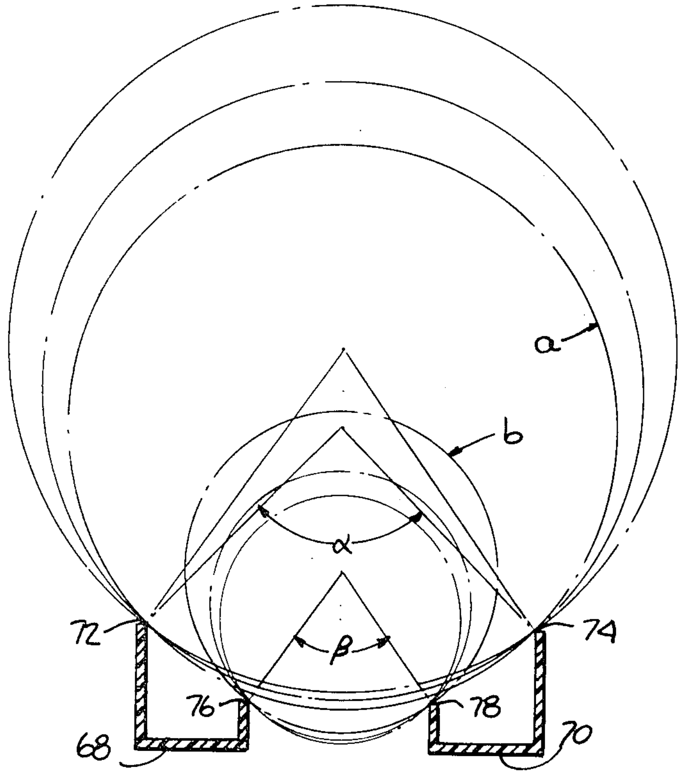
FIG. 10 is a diagrammatic side elevation view of reel storage apparatus adapted for supporting reels of varying diameter sizes, illustrating the support angles formed with the reels.

As shown in FIG. 10, two parallel supports 68 and 70 provide a pair of outer ridges 72 and 74 adapted for holding relatively large tape reels, and a pair of inner ridges 76 and 78 adapted for holding relatively small tape reels. Again, as noted in discussing the rack supports shown in FIGS. 1 to 5, the supports 68 and 70 can be formed of a single sheet of rigid material, as shown in FIG. 9, or such supports 68 and 70 can be connected together as a unit, by suitable means, not shown.

Reel *a* represents the reel having the smallest diameter of the group of relatively large reels supported on outer ridges 72 and 74, and reel *b* represents the reel having the largest diameter of the group of relatively small reels supported on inner ridges 76 and 78. Angle $\alpha$ represents the support angle formed between the two radii of reel *a* taken at the points where the reel *a* contacts the outer ridges 72 and 74. Similarly, $\beta$ represents support angle formed between the two radii of reel *b* taken at the points where the reel *b* contacts the inner ridges 76 and 78. The outer ridges 72 and 74 can be spaced apart to provide a wide angle of support for the larger reels, with the support angle $\alpha$ of the smallest reel *a* of the larger reels larger than the support angle $\beta$ of the largest reel *b* of the smaller reels. Therefore, generally, many of the large reels supported by outer ridges 72 and 74 will have support angles which are greater than or the same as the support angles of the small reels supported by inner ridges 76 and 78.

In this manner a universal rack is provided to hold different size reel cases, with the angles of support for the larger reel cases, as well as the smaller reel cases, being sufficiently large to insure stability of the reel cases over a wide range of diameters.

One or more removable separators, such as the wire separators 80 can be mounted upright in the rack 54 by simply pressing the ends 82 toward each other so that such ends 82 fit into the grooves 84 in rack 54. One separator 80 can be placed at opposite ends of the rack 54 to provide a movable end support of the reel cases, in an arrangement similar to the bookends on a bookshelf. In this manner the present invention provides a highly compact reel storage system since the requirement for a series of separators between adjacent reel cases is eliminated.

What is claimed is:

1. Apparatus for storage of tape or film reels on their rims, comprising, in combination:

a. a plurality of disc-shaped reels of different diameter sizes; and b. a horizontally elongated rack including longitudinally extending parallel supports providing a pair of spaced outer ridges supporting one or more reels of relatively large diameter and a pair of spaced inner ridges supporting one or more reels of relatively small diameter, said pair of outer ridges are both horizontally and vertically spaced apart from and above said pair of inner ridges at distances providing angles of support sufficient to stably support said reels in free-standing manner over a wide range of reel diameters.

2. Apparatus as recited in claim 1, wherein said outer ridges are both horizontally and vertically spaced apart from and above said inner ridges at distances whereby the support angle of the smallest reel which is supported on said outer ridges is greater than the support angle of the largest reel which is supported on said inner ridges.

3. Apparatus as recited in claim 1, wherein said pair of spaced outer ridges are horizontally and vertically spaced apart from and above said pair of spaced inner ridges in a symmetric manner, whereby the angles of support defined by said reels on both said outer ridges and said inner ridges are symmetrically located around the vertical line extending through the center of said reels.

4. Apparatus as recited in claim 1, wherein said disc-shaped reels are substantially enclosed individually within reel cases.

5. Apparatus as recited in claim 1, wherein said horizontally elongated rack includes means for rigidly connecting said longitudinally extending parallel supports together in spaced relation to form a rigid rack unit.

6. Apparatus for storage of free-standing tape or film reels of various thickness sizes on their rims in side-by-side relation and at indiscriminate longitudinal positions, comprising in combination:

a. a plurality of disc-shaped reels of different diameter sizes, said reels having at least one projection provided at the rim of each of said reels and extending outwardly in a substantially radial direction; and b. a horizontally elongated rack including longitudinally extending parallel supports separated from each other a distance which is substantially smaller than the smallest diameter of the reels supported thereon, and means for rigidly connecting said longitudinal supports together as a rack unit, said longitudinally extending parallel supports providing a pair of spaced outer ridges supporting one or more reels of relatively large diameter and a pair of spaced inner ridges supporting one or more reels of substantially smaller diameter, said outer ridges extending substantially above the vertical height of said inner ridges;

whereby each of said reels, when rotated past the position where said projection contacts one of said supports, will pivot and roll over said support and out of the rack space.

7. Apparatus as recited in claim 6, wherein two of said projections are provided on said reel rim at locations spaced substantially apart along the rim periphery, whereby one projection provides a pivot on one of said rack supports while the other projection provides a finger catch for rotating said reel in said rack.

* * * * *